United States Patent
Easterling

(10) Patent No.: US 7,159,832 B2
(45) Date of Patent: Jan. 9, 2007

(54) SURGICAL TABLE TOP AND ACCESSORY CLAMP USED THEREON

(75) Inventor: Barry A. Easterling, Wadsworth, OH (US)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 10/382,969

(22) Filed: Mar. 6, 2003

(65) Prior Publication Data

US 2003/0155478 A1 Aug. 21, 2003

(51) Int. Cl.
*A47G 1/10* (2006.01)

(52) U.S. Cl. .............................. 248/316.6; 248/229.14; 248/316.1; 24/455; 24/459; 24/491

(58) Field of Classification Search ............. 248/316.1, 248/316.6, 229.12, 229.14, 229.2, 231.61, 248/231.71, 228.6, 231.7, 231.41, 229.22, 248/228.3, 214; 269/86, 265, 268, 270, 244, 269/143, 145, 250; 24/455, 457, 458, 459, 24/460, 491

See application file for complete search history.

(56) References Cited

U.S. PATENT DOCUMENTS

| 760,411 | A | * | 5/1904 | Arnold | 269/261 |
| 952,787 | A | * | 3/1910 | Crawford | 269/126 |
| 969,986 | A | * | 9/1910 | Sawaya | 72/416 |
| 2,212,156 | A | | 8/1940 | Erdley | |
| 2,903,929 | A | * | 9/1959 | McVey | 72/399 |
| 3,046,072 | A | * | 7/1962 | Douglass, Jr. et al. | 5/646 |
| 3,339,913 | A | | 9/1967 | Anderson | |
| 3,386,444 | A | | 6/1968 | Brenner et al. | |
| 3,575,405 | A | * | 4/1971 | Harding | 269/258 |
| D221,910 | S | | 9/1971 | Brendgord | |
| 3,756,096 | A | * | 9/1973 | Bolden | 81/13 |
| 3,981,492 | A | | 9/1976 | Hallmann | |
| 4,018,412 | A | | 4/1977 | Kees, Jr. et al. | |
| 4,069,813 | A | | 1/1978 | Gilula | |
| 4,122,587 | A | | 10/1978 | Weiss et al. | |
| 4,143,652 | A | | 3/1979 | Meier et al. | |
| 4,145,612 | A | | 3/1979 | Cooper | |
| 4,146,793 | A | | 3/1979 | Bergstrom et al. | |
| 4,221,371 | A | | 9/1980 | Kuphal | |
| 4,287,422 | A | | 9/1981 | Kuphal et al. | |
| 4,346,298 | A | | 8/1982 | Dixit | |
| 4,355,631 | A | | 10/1982 | LeVahn | |
| 4,487,523 | A | | 12/1984 | Monroe | |
| 4,526,355 | A | * | 7/1985 | Moore et al. | 5/624 |
| 4,547,092 | A | | 10/1985 | Vetter et al. | |
| D287,625 | S | | 1/1987 | Brendgord et al. | |
| 4,698,837 | A | | 10/1987 | Van Steenburg | |
| 4,796,846 | A | | 1/1989 | Meier et al. | |
| 4,799,444 | A | * | 1/1989 | Lisowski | 114/221 R |
| 4,805,202 | A | | 2/1989 | Deucher et al. | |
| 4,901,964 | A | | 2/1990 | McConnell | |
| 4,936,836 | A | | 6/1990 | Weickgenannt | |

(Continued)

*Primary Examiner*—Amy J. Sterling
(74) *Attorney, Agent, or Firm*—Fay, Sharpe, Fagan, Minnich & McKee, LLP

(57) ABSTRACT

A medical accessory clamping system includes a table and an accessory clamp. The table has an upper surface and a lower surface, a first ridge positioned on the upper surface and a second ridge positioned on the lower surface of the table. The accessory clamp has a first clamping member and a second clamping member coupled to but separate from the first clamping member wherein the clamping members define a cavity for receiving a portion of the table. The first and second clamping members have recesses for receiving said first and second ridges of the table, respectively. A uniquely styled clamp and a table are also disclosed.

21 Claims, 5 Drawing Sheets

U.S. PATENT DOCUMENTS

| | | |
|---|---|---|
| 4,971,037 A | 11/1990 | Pelta |
| 5,014,969 A | 5/1991 | Schaefer |
| 5,029,826 A | 7/1991 | Schaefer |
| 5,052,793 A * | 10/1991 | Lapp et al. ................. 359/848 |
| 5,077,780 A | 12/1991 | Lee, Jr. |
| 5,078,705 A | 1/1992 | Edwards et al. |
| 5,090,044 A | 2/1992 | Kobayashi |
| 5,097,132 A | 3/1992 | Plummer |
| 5,279,603 A | 1/1994 | Everett et al. |
| 5,287,575 A | 2/1994 | Allen et al. |
| 5,337,760 A | 8/1994 | Nichols |
| 5,400,772 A | 3/1995 | LeVahn et al. |
| 5,535,973 A | 7/1996 | Bailey et al. |
| 5,538,215 A | 7/1996 | Hosey |
| 5,586,830 A | 12/1996 | Schwicker |
| 5,613,254 A | 3/1997 | Clayman et al. |
| 5,701,991 A | 12/1997 | Helmetsie |
| 5,771,513 A | 6/1998 | Kirchgeorg et al. |
| D408,537 S | 4/1999 | Stickley et al. |
| 5,983,426 A | 11/1999 | Vanek et al. |
| 6,023,800 A | 2/2000 | Strickley |
| 6,059,159 A * | 5/2000 | Fisher ........................ 224/403 |
| 6,499,158 B1 * | 12/2002 | Easterling ..................... 5/600 |
| 6,598,275 B1 * | 7/2003 | Kolody et al. ................. 24/455 |
| 6,622,980 B1 * | 9/2003 | Boucher et al. ....... 248/231.51 |

\* cited by examiner

SURGICAL TABLE TOP AND ACCESSORY CLAMP USED THEREON

TECHNICAL FIELD

The present invention generally relates to a surgical table top and an accessory clamp for use therewith. More particularly, the present invention relates to a surgical table top having a geometric or beveled edge and at least one ridge on each of its upper and lower surfaces, and a clamp adapted to be attached to the table by receiving the geometric edge and the table's ridges.

BACKGROUND OF THE INVENTION

Surgical table tops have been employed to perform a variety of procedures. Oftentimes, during these procedures, the patient requires fluoroscopy or other imaging procedure. Metal table tops or those with metal supports interfered with proper imaging of the patient. To that end, surgical table tops have more recently been constructed of radiolucent materials such as, for example, carbon fiber or other composites. Such table tops lacking metal components provided a patient supporting surface that did not interfere with imaging procedures.

Unfortunately, the radiolucent materials are unsuitable for supporting the attachment of accessories commonly required during medical procedures. For example, during surgical procedures, it is often necessary to use attachments, armboards, retractors, etc. for supporting the patient's limbs, trays for surgical instruments, specially designed surgical equipment, such as cameras, or robotic surgical devices, among others, in conjunction with the table top.

To accomplish this, known surgical table tops typically are provided with side rails permanently attached at opposite long sides of the table top. These rails provide an attachment point for accessories, which may be clamped or otherwise attached to the rails. While these rails were easily affixed to a conventional metal table top by fasteners, attachment to a composite table top, such as a carbon fiber composite table top) required metal inserts molded into the table top to receive those fasteners. The inserts were provided with threaded openings such that the rails could be fastened by screws and removed as necessary. Even with the rails removed, however, the metal inserts interfered with the results of the imaging process. Moreover, the metal inserts can create scatter radiation and require an increased amount of radiation and require an increased amount of radiation to be used, thereby cause potential safety problems.

Still further, since the rails extended the entire length of the table top, these rails hinder the surgeon's access to the table top. The rails prevent the surgeon and other persons providing treatment to the patient from standing immediately next to the table top. This may cause the treating personnel to function in an awkward position increasing fatigue or interfering with access to the surgical area.

To alleviate these concerns, at least one manufacturer has provided a removable clamp for a radiolucent surgical table top. Since the clamp relies on compressive force instead of fasteners for attachment to the table, the table top may be constructed without metal inserts. In this way, accessories may be removed prior to conducting imaging procedures such that the table top may be made free of metallic objects that would appear on the image if the x-ray field of view were close. The presently known clamping device includes a generally C-shaped clamp having top and bottom legs held in spaced relation by a vertical side member. The legs and side members form a single solid member defining an open-ended channel that receives an edge of the table. A clamping bar supported on the bottom leg of the clamp is selectively moveable in the vertical direction to apply a compressive force to the table top when the table top is between the bar and the first leg. The clamping bar is made flat to engage a flat bottom surface of a surgical table top and the top leg angles downwardly defining a crook or a recess for receiving the raised edge of a conventional surgical table top. The flat clamping bar may be prone to lateral deviation because it is not restrained. This deviation may be most prevalent when the clamp is loosened for longitudinal movement. Deviation may be problematic when attempting to slide the clamp to a new position. Since the clamping bar is unrestrained in the lateral direction, it may deviate causing the upper portion of the clamp to rub against the raised edge on the upper surface increasing the effort necessary to move the clamp or in extreme cases the clamp may bind against the edge of the table top. This rubbing may also abrade or gouge the surfaces of the table top or its raised edge leading to further clamp-moving difficulty.

As a further disadvantage, the edges of most conventional surgical table tops are square. Despite the use of radiolucent material, when x-raying from an oblique angle, the squared edge of the conventional table appears on a flouroscopic image as a thin line. As will be appreciated, this line may obscure important details of the image.

SUMMARY OF THE INVENTION

It is, therefore, an aspect of the present invention to provide a surgical table top capable of having an accessory clamp removably mounted thereon.

It is another aspect of the present invention to provide an accessory clamp which is removable from an at least partially radiolucent surgical table top.

It is still another aspect of the present invention to provide a medical accessory clamping system comprising a surgical table top and a removably mounted accessory clamp, wherein the clamp is capable of supporting attachments thereto when mounted on the surgical table top.

At least one or more of the foregoing aspects, together with the advantages thereof over the prior art relating to medical equipment such as tables and clamps, which shall become apparent from the specification which follows, are accomplished by the invention as hereinafter described and claimed.

In general, the present invention provides a medical accessory clamping system including a table top having an upper surface and a lower surface, and at least a first ridge positioned on the upper surface and at least a second ridge positioned on the lower surface of the table; and an accessory clamp having a first clamping member and a second clamping member coupled to but separate from the first clamping member, the first and second clamping members defining a cavity for receiving a portion of the table top, the first clamping member having a first recess for receiving the first ridge and the second clamping member having a second recess for receiving the second ridge.

The present invention further provides a clamp for receiving a geometrically shaped article, the clamp including a first clamping member having a first recess; and a second clamping member having a second recess and being operatively coupled to but separate from the first clamping member, wherein the first and second clamping members and their respective recesses define a cavity for receiving the geometrically shaped article such that the recesses engage at least a portion of the geometrically shaped article.

The present invention further provides a medical table top including an upper surface, a lower surface, at least a first ridge positioned on the upper surface near the periphery of the table top, and at least a second ridge positioned on the lower surface near the periphery of the table top. At least a patient receiving portion of the table top may be made from radiolucent materials.

DETAILED DESCRIPTION

Figure 1:
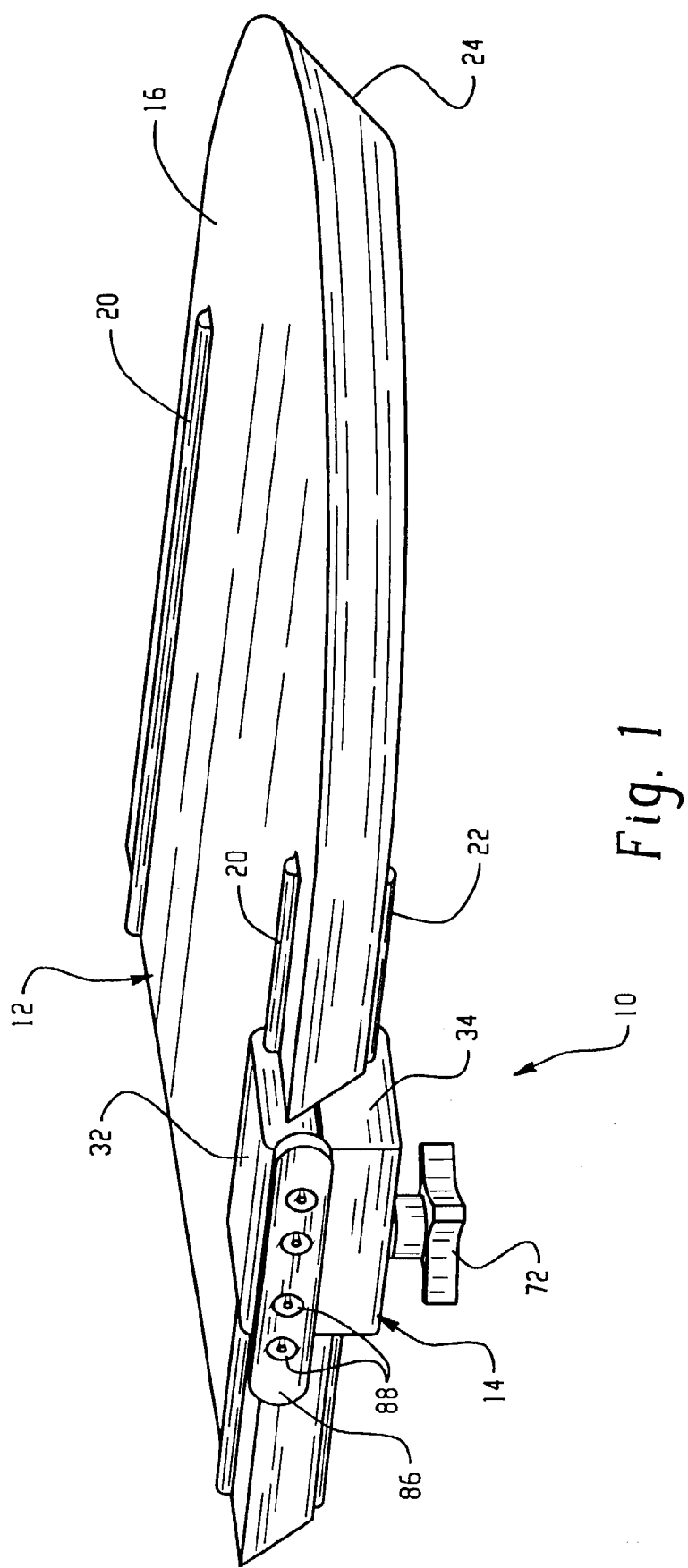
FIG. 1 is a perspective view of the medical accessory clamping system according to the present invention wherein a removable accessory clamp is attached to a surgical table top.

In the description which follows like parts are marked throughout the specification and drawing figures with the same reference numerals, respectively. The drawing figures are not necessarily to scale and certain elements may be shown in schematic or generalized form or omitted from certain views in the interest of clarity and conciseness.

Figure 5:
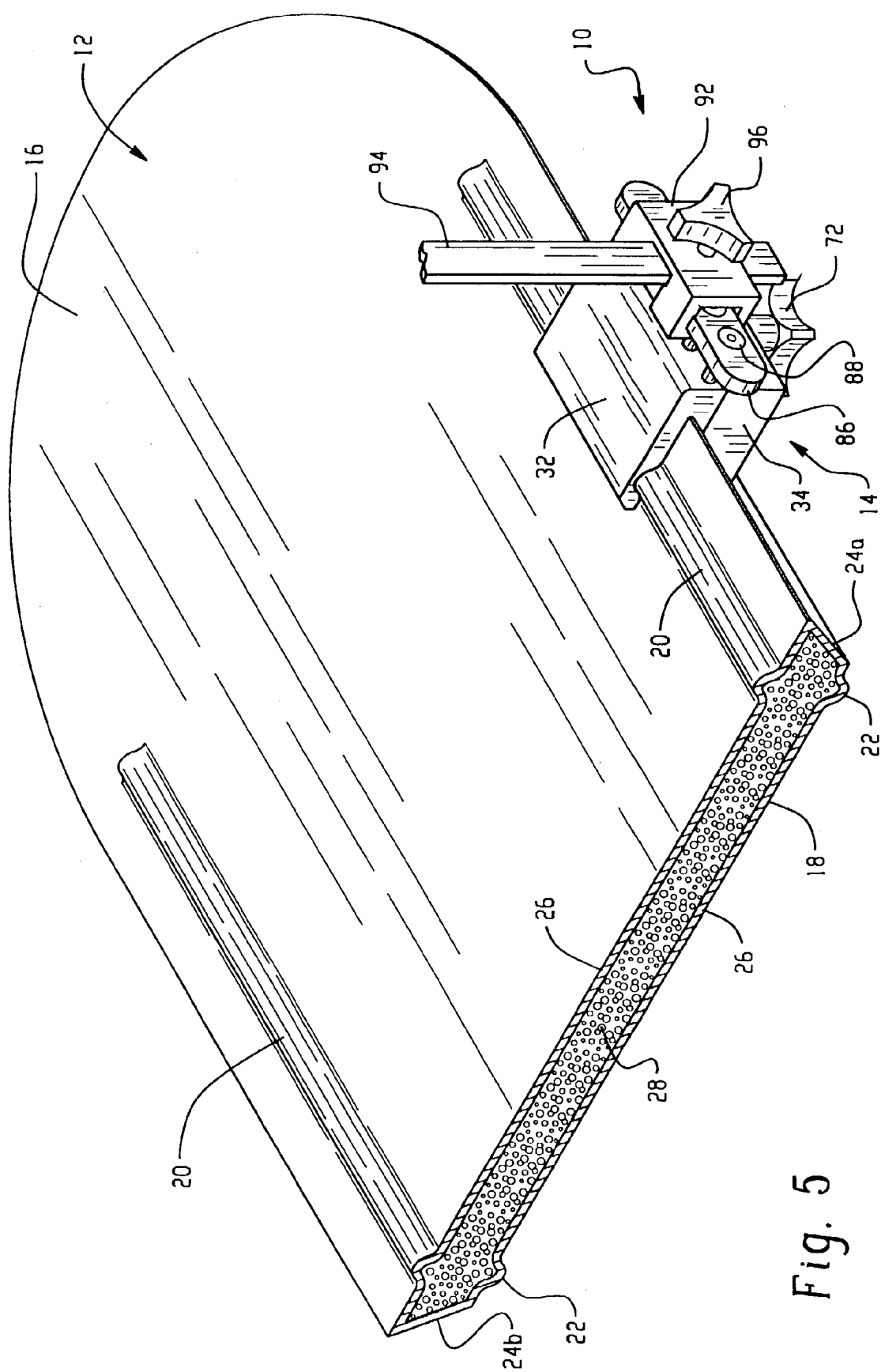
FIG. 5 is a perspective view of the medical accessory clamping system showing a medical accessory (partially cut away) supported on a surgical table top (also partially cut way) by an accessory clamp according to the concepts of the present invention.

A representative medical accessory clamping system according to the concepts of the present invention is generally shown in FIGS. 1 and 5 and is generally indicated herein to by the numeral 10. This clamping system 10 generally includes a table top, referred to generally by the numeral 12, and an accessory clamp, referred to generally by the numeral 14.

Table top 12 is used to support a patient in need of care, such as for purposes of surgery or the like. It has an upper surface 16 and a lower surface 18, on which are positioned at least a set of first and second ridges, 20 and 22 near the periphery of each surface 16 and 18, respectively. First and second ridges 20, 22 may be of any shape or cross-section capable of receiving or attaching and/or, more preferably, capable of permitting the guiding movement of the accessory clamp 14 as described hereinbelow, while holding the clamp in a rigid and stable manner. To reduce the likelihood of clothing or other items catching on ridges 20, 22, they are preferably smooth as shown in FIG. 5. Each ridge may have the same or different shape from another depending upon the construction of the table top, and may be made integral with or separate from the table top itself. Each ridge may be continuous or made of discrete sections collinear with each other.

Each first ridge 20, formed on the topside 16 of table top 12 is generally positioned near the perimeter or periphery of the upper surface 16 and preferably extends substantially along the entire length of table top 12, or at least along the length of that portion of the table top defined herein as the patient receiving portion. Each second ridge 22 may be similarly formed on the underside 18 of the table top 12 and preferably extends substantially vertically parallel to its opposed first ridge 20 along the entire length of the table top 12, or at least along the length of the patient receiving portion of the table top 12.

The table top 12 further includes a side edge 24 connecting the periphery of each surface. For purposes of clarity, the side edge 24 will be differentiated as a first side edge 24a defining the right hand side of the table top 12 and a second side edge 24b defining the left hand side of the table top 12.

In a preferred embodiment and as shown in at least FIG. 5, a pair of first ridges 20 are formed on the upper surface 16 of the table top 12, both first ridges 20 being parallel to one of the respective side edges 24a or 24b of the table top 12. Similarly, as best seen in FIG. 5, a pair of second ridges 22 are formed on the lower surface 18 of the table top 12, with each second ridge 22 being parallel to one of the respective side edges 24a, 24b of the table top 12.

Figure 6:
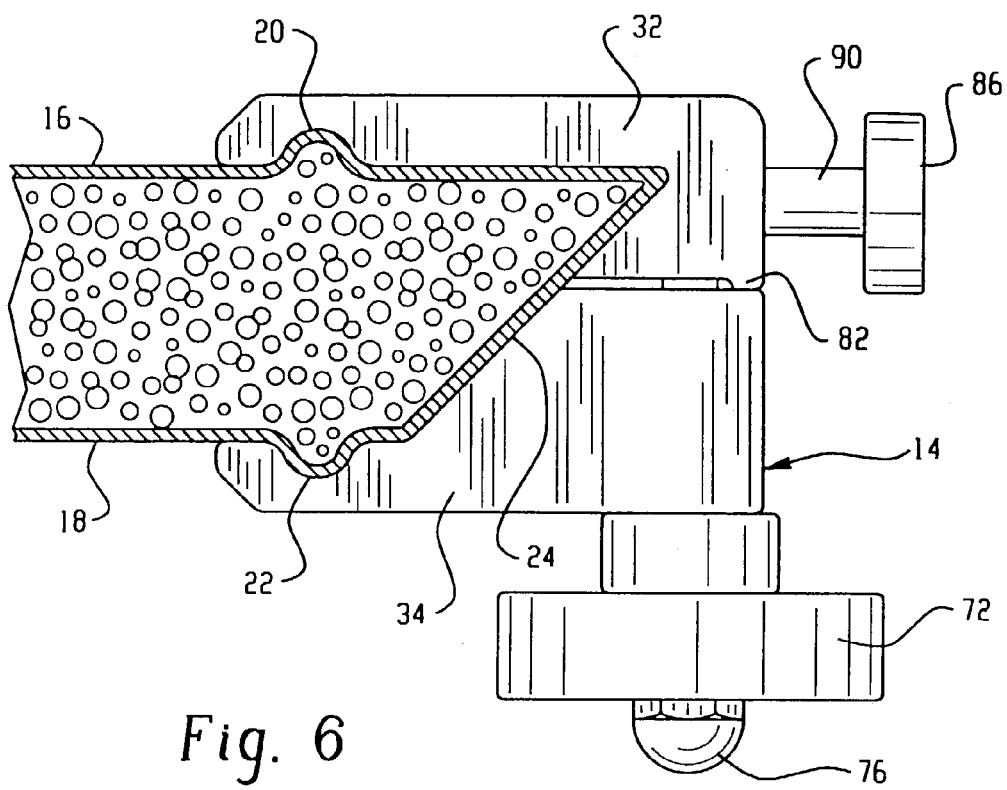
FIG. 6 is a end view of the accessory clamp attached to a table top shown in cross section.

As best shown in FIGS. 1 and 6, side edge 24 is preferably irregular to the extent that it is not a vertical edge between the surfaces of table top 12. To that end, the side edge 24 may be straight, curved or staggered. Preferably, side edge 24 is beveled, extending downwardly and inwardly from the upper surface 16 to the lower surface 18. More particularly, the beveled edge 24 is angled at approximately 45°. Such an angle promotes better image visualization and gives the user the ability to make a more accurate diagnosis when imaging a patient at the edge of the table top, specifically long the beveled edge in an anterior/posterior position. That is, the beveled edge reduces the dominance of the side of the table 12 in oblique fluoroscopic or x-ray images. In imaging with a 90° edge of a table top, the vertical edge may still appear as a thin line on a flouroscopic image.

As noted hereinabove, it may become desirable to perform imaging, such as x-rays, during procedures performed on patient. To facilitate this, radiolucent materials may be substituted for conventional stainless steel or aluminum in the construction of at least a major portion, if not the entirety of the table top 12, so as to create a metal-free imaging area. In a preferred embodiment, the table top is capable of supporting a 500 lb. patient weight capacity with no metal included in at least 55 inches of its preferred 92-inch length. This 55-inch portion is referred to hereinafter as a patient receiving portion and is preferably constructed of carbon fibers or other radiolucent materials. That is, the patient receiving portion, which is essentially the entire table top portion shown in FIGS. 1 and 5 and is therefore not renumbered, is constructed entirely of carbon fiber or, as shown, of a carbon fiber shell 26 surrounding a foam 28 interior.

It will be appreciated that table top 12 may be mounted on a base (now shown) as is known in the art. The base may take any form conventional in the art including that of a single pillar, a plurality of legs or other supporting structures used to support the table top 12. Alternatively, the table top could even be suspended by various suspension mechanisms. In addition, the table base itself may be stationary or mobile as necessary, while the table top 12 may also be stationary or moveable with respect to the base. In a preferred embodiment, at least the patient supporting portion of the table top 12 is cantilevered from the base such that there is nothing beneath that portion of the table top 12. With the patient supporting portion in this arrangement, the table top 12 provides a large surface usable for taking x-rays or other imaging.

The table top 12 of the present invention, like other conventional table tops, may further include strap retainers (not shown) attached to the table top. Such strap retainers, used to maintain any straps that may be used to restrain the patient to the table top, are also preferably constructed of similar radiolucent materials to lessen the chances of interference with imaging. Strap retainers, where used, are typically placed on the underside 16 of the table top 12 in pairs at or near the side edges 24. These strap retainers also may be made removable from the table top 12 allowing complete removal of the retainers during imaging or whenever removal is desired.

The other major part of the medical accessory clamping system of the present invention is the clamp 14. It will be appreciated that, given the uniquely constructed table top 12, a conventional clamp, such as one with a square opening or a standard C-clamp, is basically unusable and will not adequately clamp to the irregular side edges 24 of the table top 12. The clamp 14 of the present invention solves this problem, and can be of any size or configuration useful in the art.

The accessory clamp 14 of the present invention, depicted best in FIGS. 2, 3, 6 and 7, includes at least a first clamping member 32 and a second clamping member 34 coupled to but separate from or independent of the first clamping member 32. These first and second clamping members 32, 34 define a cavity 36 for receiving at least the side edge 24 of the table top 12 or other geometrically shaped article needing clamped. Notably, the first clamping member 32 includes a first recess 40 for receiving the first ridge 20 of the table top 12 and the second clamping member 34 includes a second recess 42 for receiving the second ridge 22 of said table top 12, the recesses 40, 42 also forming a part of the cavity 36.

In a preferred embodiment, the cavity 36 defined by at least the first and second clamping members 32, 34 is of a geometry that substantially conforms to that portion of the table top 12 received by the cavity 36. In other words, cavity 36 is preferably defined by the first clamping member 32 having a first clamping surface 44 with the first recess 40 defined therein and a tapered conforming surface 46 extending from the first clamping surface 44 distal to the open end of the cavity 36, while the second clamping member 34 likewise has a second clamping surface 48 with the second recess 42 defined therein and another tapered conforming surface 50 extending from the second clamping surface 48 distal to the open end of the cavity 36. In order to conform to the geometry of the table top 12, first clamping surface 44 with its first recess 40 and second clamping surface 48 with its second recess 42 are in opposed, essentially parallel relationship to each other and engage the upper and lower surfaces 16, 18 of the table top, respectively. As such, first and second recesses 40, 42 also engage their mating ridges 20, 22 on the upper and lower surfaces 16, 18 of the table top 12 and are preferably vertically planar to each other. That is, a first recess 40 engaging a first ridge 20 of the table top 12 and an opposed second recess 42 engaging a second ridge 22 of the table top 12 are all in vertical alignment. Further, tapered conforming surfaces 46 and 50 each conform to the beveled angle of the side edge 24 of the table top 12 and are more particularly aligned to be co-planar with each other when the clamp 14 is closed and clamped to the table top 12.

The clamping and conforming surfaces 44, 46, 48 and 50 defining cavity 36 of the clamp 14 thus essentially mirror those surfaces and side edges of the table top 12. It is believed that this arrangement spreads the clamping forces over a larger surface area on the table top 12 thereby reducing the likelihood of localized deformation including gouging of these surfaces by excessive application of clamping force.

Clamping members 32, 34 may generally be of any dimension, size or shape provided that they are large enough to define a cavity 36 suitable for receiving the side edge 24 of the table top 12. Furthermore, the clamping members 32, 34 may have any surface characteristics, but preferably their surfaces machined relatively smooth with the edges rounded over or tapered to reduce a likelihood of a patient's or medical personnel's clothing or bodies from being snagged on the clamp 14. For example, both the first and second clamping members 32, 34 include a generally smooth external surface 52, 54, respectively, which then gradually tapers toward the cavity 36 as an angled surface 56, 58, respectively, to an end surface 60, 62, respectively, the end surfaces 60, 62 being adjacent the first and second clamping surfaces 44, 48, respectively, at the mouth of cavity 36.

When used with the table top 12 having first and second ridges 20, 22, the first and second clamping members 32, 34, by way of their first and second recesses 40, 42 communicate with and otherwise engage these ridges. Preferably the recesses and the ridges are rounded and smooth to allow for the gliding of the clamp 14 alone the table top without having to remove the clamp 14 completely. That is, the rounded, smooth surfaces of the recesses 40, 42 are generally of any shape capable of engaging the like smooth surfaces of the ridges 20, 22 and are sized such that they conform closely to the width of the ridges 20, 22, thereby allowing the clamp 14 to glide or slidingly move along the length of the table top 12, if not clamped tightly.

In addition to the surfaces already discussed, first and second clamping members 32, 34 also include opposing parallel surfaces 64 and 66 which define a bore therein for receiving a coupling mechanism 68. The coupler 68 may be any known mechanism suitable for bringing the clamping members 32, 34 into clamped engagement with table top 12 or for releasing the clamping members 32, 34 from the table top 12. Examples of known couplers include but are not limited to screws, levers, gears, ratchet or cam mechanisms. As will be understood, the means for actuating or coupling the first and second clamping members 32, 34 are well known and any of these conventional couplers may be substituted within clamp 14 with little modification. Thus, while only one exemplified embodiment of a coupler is shown in the drawings, any conventional coupler or actuator may be used in accordance with the spirit of this invention.

As shown in the drawings, a coupler) generally referred to by the numeral 68, is received by first and second clamping members 32, 34. Coupler 68 more particularly for this embodiment includes a threaded shaft 70 running between the first and second clamping members 32, 34 and a knob 72 rotatably mounted to the shaft 70 adjacent one of the clamping members and distal to the other of the clamping members. A spring 74 biases the clamping members 32, 34 apart, but rotation of the knob 72 causes the knob 72 to move axially along the threaded shaft 70, bring the clamping members 32, 34 closer together or farther apart. Rotational direction of knob 72 controls the selective opening or closing of the clamping members 32, 34.

The spring 74 is preferably a helical spring and is compressed between first and second clamping members 32, 34 such that it exerts an axial outward force against each of the clamping members 32, 34 that aids in driving the clamping members 32, 34 apart when the knob 72 is loosened. While spring 74 may simply rest between clamping members 32, 34, a spring recess may be formed within one or both of the clamping members 32, 34 to receive and radically confine either or both of the ends of spring 74 thereby aiding in the proper positioning of spring 74.

A nut or other stop mechanism 76 is also shown to prevent the knob 72 from coming off of the threaded shaft 70. The stop mechanism 76 may be made adjustable to selectively control movement of the knob 72.

Figure 3:
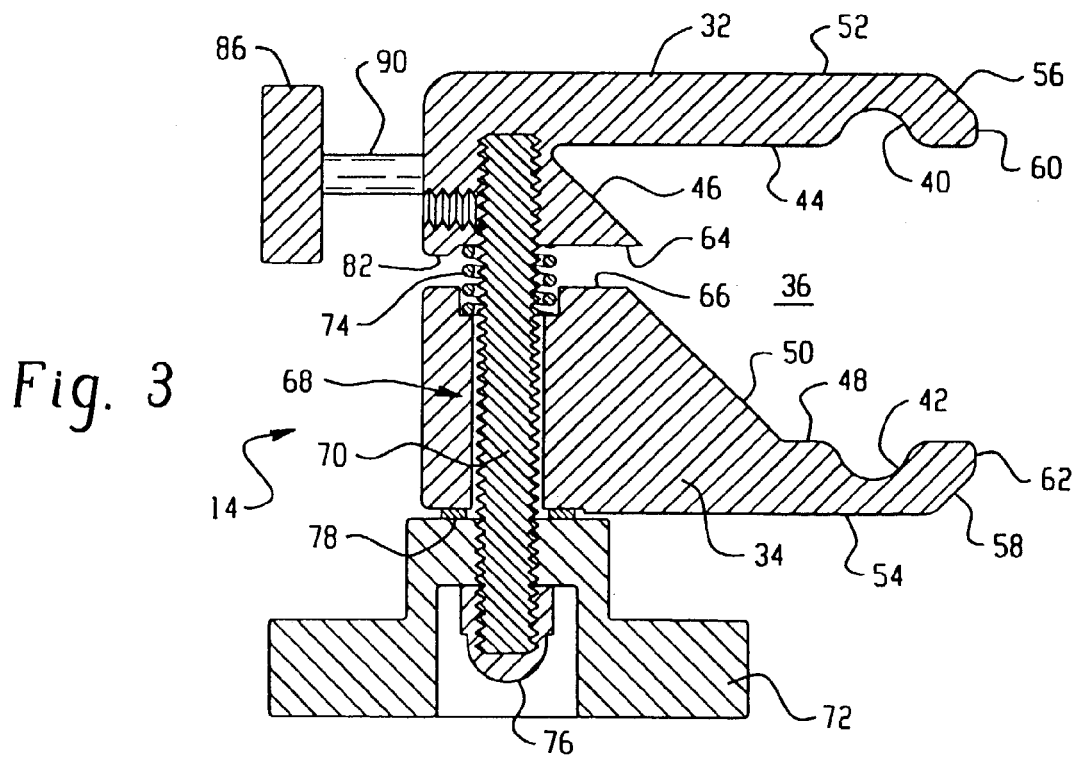
FIG. 3 is an end view of the accessory clamp of FIG. 2 shown in cross-section through the coupling mechanism of the clamp.
Figure 4:
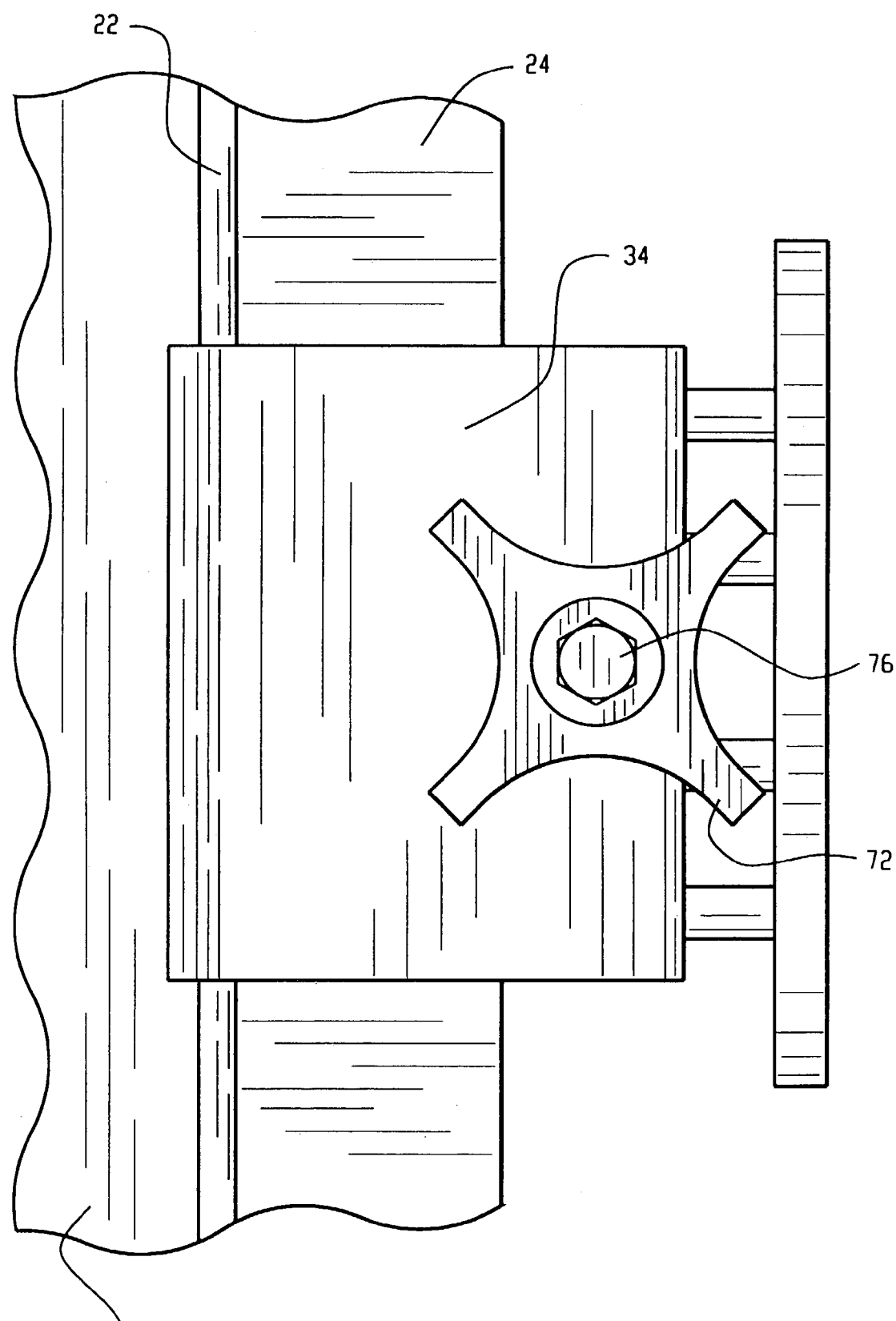
FIG. 4 is a bottom elevational view of the accessory clamp of FIG. 1 attached to the table top shown partially cut away.

In the embodiment shown in FIG. 3, clockwise rotation of knob 72 moves clamping members 32, 34 toward each other and counter clockwise rotation allows the clamping members 32, 34 to move away from each other. A washer 78 may be mounted between the knob 72 and the lower surface 54 of second clamping member 34 to prevent contact between the rotating knob 72 and lower surface 54 that might gouge or otherwise abrade the lower surface 54. Additionally, washer 78 may reduce the likelihood of knob 72 binding when fully tightened. The lower surface 54 of second clamping member 34 may be recessed to at least partially receive washer 78 when knob 72 is tightened. It will also be appreciated that, while the knob 72 is shown beneath the second clamping member 34) knob 72 may be placed in other locations including the upper surface 52 of first clamping member 32 or at other exterior surfaces of the clamp 14. As previously discussed, other structures may be used to actuate or couple the clamping members 32, 34 between open and closed positions and the location of the actuator/coupler 68 may vary accordingly.

Figure 2:
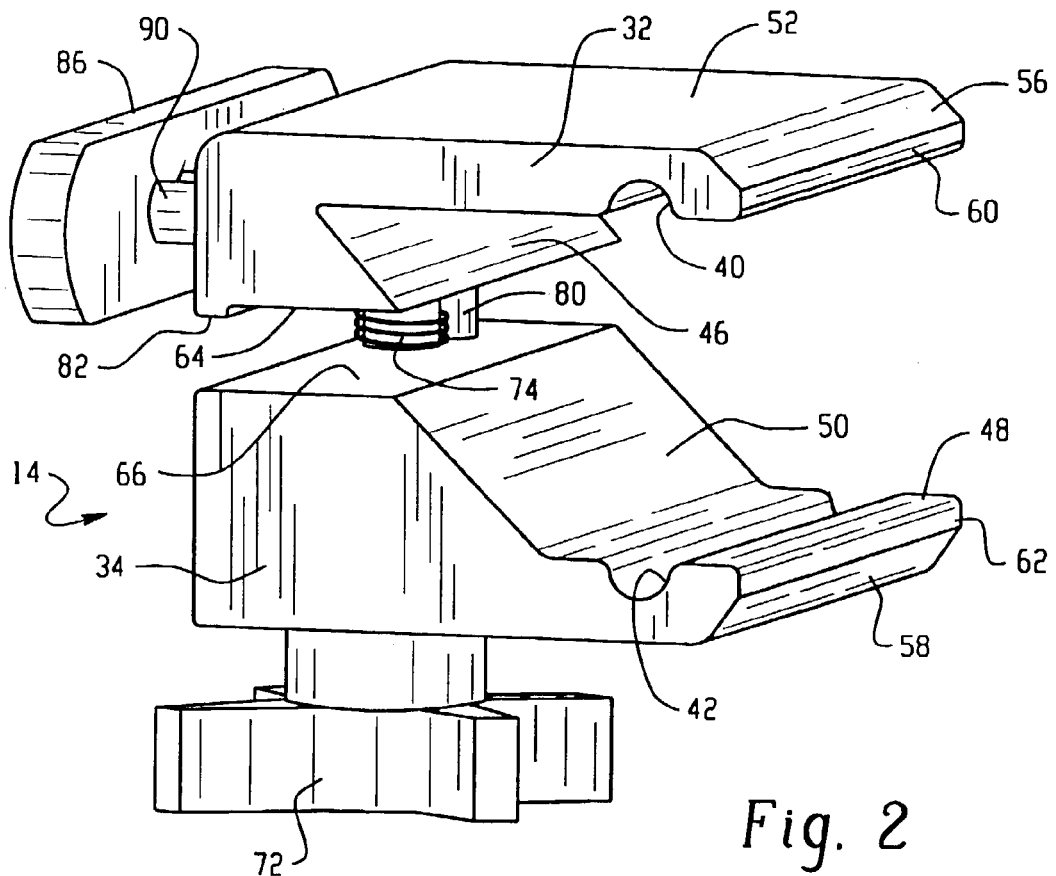
FIG. 2 is a perspective view depicting a accessory clamp in an open position.

As shown in FIG. 2, a post 80 may be housed between first and second clamping members 32, 34 to prevent relative rotation thereof caused by torquing of knob 72 and maintaining longitudinal alignment of the clamping members 32, 34. Additional posts may be added to further aid in the alignment of these members, and absorb torque created by actuation of knob 72. Post 80 is spaced from threaded shaft 70 and held in a fixed location in a plane parallel to the threaded shaft 70. In the depicted embodiment, post 80 is sized such that it maintains simultaneous contact with first and second clamping members 32, 34 when these members are in the fully open position such that post 80 acts as a rotational stop throughout actuation of the clamp 14. It is foreseeable, however, that such stopping action may not be strictly required at all points during vertical movement of the members 32, 34, such as the open position when the clamp 14 is being removed. Thus, post 80 need not extend into both clamping members 32, 34 when clamp 14 is opened. Post 80 may also be of any cross-section and have any shape provided that it does not unduly interfere with movement of the clamping members 32, 34 between open and closed positions.

Figure 7:
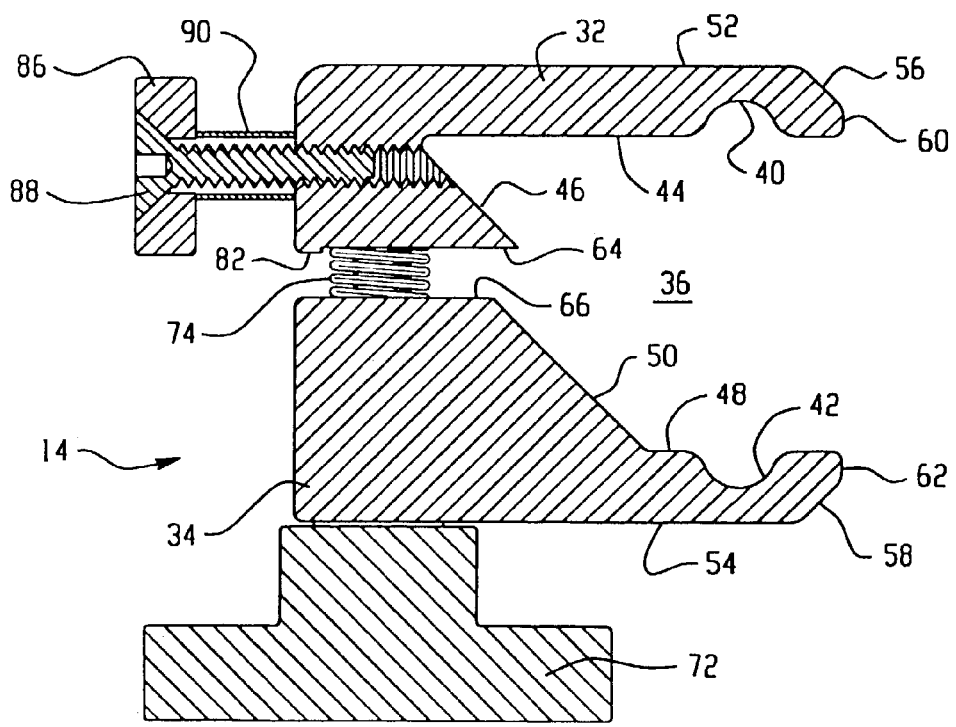
FIG. 7 is an end view of the accessory clamp of FIG. 2 shown in cross-section through the accessory rail connecting mechanism of the clamp.

As will be appreciated, some irregularities in the surfaces of table top 12 may be present. Accordingly, the clamp 14 may be provided with some structure which will enable it to accommodate these irregularities. For example, as best shown in FIGS. 2, 3 and 7, a protrusion 82 may be formed on one of said surfaces 64 or 66 of said first or second clamping members to provide lateral play. Protrusion 82 may extend the entire length of clamp 14, or it may extend to a lesser extent, or be formed by a plurality of staggered protrusions. The protrusion 82 may be of any shape or cross-section, although the outermost portion should be flat for engagement with the other surface of the opposing clamping member.

As shown in FIG. 6, when clamping members 32, 34 are brought into clamping engagement, protrusion 82, here positioned on and extending from surface 64 of the first clamping member 32, engages the surface 66 of second clamping member 34 leaving a very small gap adjacent the protrusion 82. The gap allows play in the lateral direction between the clamping members 32, 34 to allow the clamping members 32, 34 to adjust to irregularities in the surfaces 16, 18 of the table top 12 or ridges 20, 22. Moreover, as shown, protrusion 82 is formed at an outside edge of the surface 64 or 66 of said first or second clamping member 32, 34.

In the longitudinal direction, play may preferably be introduced by using only a single post 80 located on one side of a centrally positioned coupler 68. In this way, the angular movement of the clamping members 32, 34 in the longitudinal direction is somewhat restricted on one side by the post 80, but unrestricted on the post-free side. This freedom allows angular play over the length of the clamp 14 accommodating irregularities in the clamped, geometrically shaped article found along the length of the clamp 14. By introducing some play between the clamping members 32, 34, contact may occur between the clamping members 32, 34 without unduly deforming the article when an irregularity would cause the article to be slightly larger than the cavity 36. When not relying on play, a slight loosening of knob 72 allows the gap to open and clamp member 14 may be more easily slid along ridges 20, 22, or removed altogether. That is, loosening knob 72, opens clamp member 14 by separating clamping members 32, 34. To remove the clamp 14, the clamping members may be opened sufficient wide to allow the clamp 14 to be removed from the table top over the ridges 20, 22, or may be opened to allow sliding movement along the table top. In other words) the clamp 14 may be clamped over the table top 12 by opening the clamping members wide enough to permit placement of the clamp 14 on the table top 12, or may be slidingly positioned on the table. Of course, either method may be used to remove the clamp as well.

The clamp 14 further may include an accessory rail 86 for attaching accessories to the clamp. Such a rail 86 is essentially a shorter version of the conventional rails typically used in attaching accessories to surgical table tops. The rail 86 may be mounted to the clamp 14 by any manner known in the art. In the preferred embodiment shown in FIG. 7, the rail 86 is attached to the first clamping member 32 by a plurality of threaded screws or other fasteners 88 received through bores located in the back of the clamping member 32. In other to protect the threads of the screw 88 and to provide supporting strength to the rail 86, a spacer 90 is preferably positioned around each screw 88 between the rail 86 and the first clamping member 32 so as to space apart the rail 86 from the clamp 14.

Retractors, arm extensions, or other known accessories (not shown) may be directly attached to rail 86 of clamp 14, or as shown in FIG. 5, may be provided with a mounting bracket 92 that provides a point of attachment for these accessories. In the embodiment shown, the bracket 92 is attached to rail 86 of first clamping member 32 by a well known technique. Bracket 92 is preferably attached such that top surface of the bracket 92 is approximately at the same approximate height as the top surface 52 of first clamping member 32. The bracket 92 is generally an elongated member that provides sufficient area and structure for the attachment of an accessory such as 94. For example, as shown in FIG. 5, the bracket may include a rotational piece 96 for tightening or loosening the accessory 94 from the bracket 92 or the bracket 92 from the rail 86.

It should therefore be apparent that the present invention reduces interference with imaging by providing a table top having a geometric side edge and a removable clamp for mounting accessories to this side edge. The present invention further provides more secure attachment of the clamp to a table top. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A clamp for receiving an associated geometrically shaped article having top and bottom surfaces and a beveled edge, the clamp comprising:
    a first clamping member having a first recess, a first clamping surface, and a first tapered conforming surface;
    a second clamping member having a second recess, a second clamping surface, and a second tapered conforming surface, and being operatively coupled to but separate from said first clamping member, wherein said first and second clamping members define a cavity for receiving the associated geometrically shaped article, said first and second clamping surfaces being adapted to engage the top and bottom surfaces of the geometrically shaped article, respectively, when the associated article is received in the clamp, and the first and second tapered conforming surfaces are adapted to engage said beveled edge and are parallel to each other and co-planar with each other when the associated article is received in said clamp; and,
    an accessory rail mounted to one of said first or second clamping members.

2. The clamp of claim 1, wherein said first and second recesses oppose and are vertically planar to one another.

3. The clamp of claim 1, wherein said first and second clamping members are combined by a coupler, said coupler having a threaded shaft running between the first and second clamping members and a knob rotatably mounted to said shaft adjacent one of said first or second clamping members and distal to the other of said claiming members.

4. The clamp of claim 1, wherein said accessory rail is separated from said clamping member by at least one spacer mounted between said accessory rail and said clamping member.

5. The clamp of claim 3, wherein said first and second clamping members each have a surface essentially parallel and opposing each other and receiving said coupler therethrough.

6. The clamp of claim 5, wherein a protrusion is formed on one of said opposing surfaces of said first or second clamping members and is adapted to engage said surface of the other of said surfaces of said first and second clamping members.

7. A clamp for use with an associated geometrically shaped table having an outer edge defined between upper and lower surfaces, the outer edge defining a beveled angle relative to the upper and lower surfaces, a first ridge on the upper surface spaced inwardly from said outer edge, and a second ridge on the lower surface spaced inwardly from said outer edge, the clamp comprising:
    a first clamping member; and,
    a second clamping member operatively coupled with the first clamping member, the first and second clamping members defining a cavity with an open end therebetween, the first clamping member having a first clamping surface including a first recess shaped to receive said first ridge of the associated table and a first tapered conforming surface extending from the first clamping surface distal to the open end of said cavity and positioned to engage a first portion of said outer edge of the associated table, the second clamping member having a second clamping surface including a second recess shaped to receive said second ridge of the associated table and a second tapered conforming surface extending from the second clamping surface distal to the open end of said cavity and positioned to engage a second portion of said outer edge of the associated table, the first tapered conforming surface of the first clamping member and the second tapered conforming surface of the second clamping member being disposed in co-planar alignment with each other when the clamp is clamped onto the associated table.

8. The clamp according to claim 7, further including:
    a coupling mechanism adapted to bring the first and second clamping members into clamped arrangement with the associated table.

9. The clamp according to claim 8, wherein the coupling mechanism includes at least a one of a screw, lever, gear, rachet, and a cam mechanism.

10. The clamp according to claim 9, wherein:
    the first clamping member defines a threaded bore;
    the second clamping member defines a bore opening;
    the coupling mechanism includes a threaded shaft extending through said bore opening and into said threaded bore; and,
    a knob on an end of the threaded shaft whereby rotational movement of the knob and threaded shaft urges the first and second clamping members into clamping engagement with said associated table.

11. The clamp according to claim 10, further including a resilient member compressed between said first and second clamping members, said resilient member being adapted to exert axial outward force against each of said first and second clamping members for biasing the first and second clamping members apart when said threaded shaft is loosened.

12. The clamp according to claim 11, further including a stop mechanism associated with said coupling mechanism for preventing said coupling mechanism from becoming disconnected from said clamp.

13. The clamp according to claim 10, further including an alignment mechanism arranged to prevent relative rotation between said first and second clamping members when said threaded shaft is rotated.

14. The clamp according to claim 13, wherein said alignment mechanism is a post member extending from one of said first and second clamping members into a bore defined in the other of said first and second clamping members.

15. The clamp according to claim 8, further including a protrusion formed on at least one of said first and second clamping members on a side of said coupling mechanism opposite from said cavity, said protrusion inducing contact between said first and second clamping members on said side of said coupling mechanism opposite from said cavity to adapt said clamp for coupling engagement with said associated geometrically shaped table having surface irregularities.

16. The clamp according to claim 7, further including an accessory rail coupled with at least one of said first clamping member and said second claiming member.

17. A clamp for receiving an associated geometrically shaped article having top and bottom surfaces and a beveled edge, the clamp comprising:
- a first clamping member having a first clamping surface and a first tapered conforming surface;
- a second clamping member having a second clamping surface and a second tapered conforming surface, the second clamping member being operatively coupled to but separate from said first clamping member, wherein said first and second clamping members and their respective surfaces define a cavity for receiving the associated geometrically shaped article, said first and second clamping surfaces being adapted to engage the top and bottom surfaces of the geometrically shaped article, respectively, when the associated article is received in the clamp, and the first and second tapered conforming surfaces are adapted to engage said beveled edge and are parallel to each other and co-planar with each other when the associated article is received in said clamp; and,
- an accessory rail mounted to one of said first or second clamping members.

18. The clamp of claim 17, further including a coupler coupling said first and second clamping members, said coupler having a threaded shaft extending between the first and second clamping members.

19. The clamp of claim 17, wherein:
- said first clamping member includes a first recess; and,
- said second clamping member includes a second recess.

20. A clamp for use with an associated geometrically shaped table having an outer edge between upper and lower surfaces, the outer edge defining a beveled angle relative to the upper and lower surfaces, a first ridge on the upper surface spaced inwardly from said outer edge, and a second ridge on the lower surface spaced inwardly from said outer edge, the clamp comprising:
- a first clamping member; and,
- a second clamping member operatively coupled with the first clamping member, the first and second clamping members defining a cavity with an open end therebetween, the first clamping member having a first recess shaped to receive said first ridge of the associated table and a first tapered conforming surface opposite said open end of said cavity and positioned to engage a first portion of said outer edge of the associated table, the second clamping member having a second recess shaped to receive said second ridge of the associated table and a second tapered conforming surface opposite said open end of said cavity and positioned to engage a second portion of said outer edge of the associated table, the first tapered conforming surface of the first clamping member and the second tapered conforming surface of the second clamping member being disposed in parallel and co-planar alignment with each other when the clamp is clamped onto the associated table.

21. The clamp according to claim 20, further including:
- a coupling mechanism adapted to move the first and second clamping members into clamped arrangement with the associated table.

* * * * *

UNITED STATES PATENT AND TRADEMARK OFFICE
CERTIFICATE OF CORRECTION

PATENT NO.        : 7,159,832 B2                                        Page 1 of 1
APPLICATION NO.   : 10/382969
DATED             : January 9, 2007
INVENTOR(S)       : Easterling It is certified that error appears in the above-identified patent and that said Letters Patent is hereby corrected as shown below:

On the title page item (30) insert

The domestic priority data as claimed by applicant has been omitted from the face of the patent.

Specifically:

This application (10/382,969) is a div. of 10/292,360 filed 11/12/2002 (now US Pat. 6,671,904) which, in turn, is a div. of 09/699,812 filed 10/30/2000 (now US Pat. 6,499,158).

Signed and Sealed this

Twenty-second Day of January, 2008

JON W. DUDAS
*Director of the United States Patent and Trademark Office*